US008661170B2

(12) United States Patent
Sato

(10) Patent No.: US 8,661,170 B2
(45) Date of Patent: *Feb. 25, 2014

(54) NONDESTRUCTIVE TESTING SYSTEM

(75) Inventor: Saichi Sato, Sagamihara (JP)

(73) Assignee: Olympus Corporation, Tokyo (JP)

( * ) Notice: Subject to any disclaimer, the term of this patent is extended or adjusted under 35 U.S.C. 154(b) by 602 days.

This patent is subject to a terminal disclaimer.

(21) Appl. No.: 12/952,487

(22) Filed: Nov. 23, 2010

(65) Prior Publication Data
US 2012/0131325 A1 May 24, 2012

(51) Int. Cl.
G06F 13/12 (2006.01)
G06F 13/38 (2006.01)
G06F 1/24 (2006.01)
G06F 9/00 (2006.01)

(52) U.S. Cl.
USPC .............................. 710/72; 710/14; 713/100

(58) Field of Classification Search
None
See application file for complete search history.

(56) References Cited

U.S. PATENT DOCUMENTS

| 5,864,369 | A | 1/1999 | Swan |
| 5,868,666 | A * | 2/1999 | Okada et al. ................. 600/118 |
| 7,228,188 | B1 | 6/2007 | Aihara et al. |
| 2002/0087489 | A1 | 7/2002 | Iizuka |
| 2003/0236446 | A1 * | 12/2003 | Eino .............................. 600/160 |
| 2004/0090597 | A1 | 5/2004 | De Haan |
| 2006/0284632 | A1 * | 12/2006 | Braverman et al. ........... 324/765 |
| 2008/0043775 | A1 | 2/2008 | Fujinami et al. |
| 2008/0091065 | A1 * | 4/2008 | Oshima et al. ................ 600/109 |
| 2009/0013368 | A1 | 1/2009 | Mimura et al. |
| 2012/0131667 | A1 * | 5/2012 | Yokota et al. .................... 726/21 |

FOREIGN PATENT DOCUMENTS

JP 2009-516844 A 4/2009

OTHER PUBLICATIONS

U.S. Appl. No. 12/948,842: First Named Inventor: Masayoshi Yokota: filed Nov. 18, 2010; Title: "Nondestructive Testing System".
Final Office Action dated Aug. 19, 2013, issued in related U.S. Appl. No. 12/948,842.
Non-Final Office Action dated Dec. 20, 2012, issued in related U.S. Appl. No. 12/948,842.

* cited by examiner

Primary Examiner — Kris Rhu
(74) Attorney, Agent, or Firm — Holtz, Holtz, Goodman & Chick

(57) ABSTRACT

A nondestructive testing apparatus includes a storage section which stores a plurality of predetermined functions which are executable by the nondestructive testing apparatus, each of the predetermined functions being initially set to one of a permitted state and a disabled state; an input section which includes a plurality of input portions respectively corresponding to the predetermined functions; and a control section which is adapted to receive permission information including information which unlocks at least one of the predetermined functions initially set in the disabled state so as to be set to the permitted state. The control section automatically assigns the at least one predetermined function which has been unlocked to the corresponding input portion of the input section.

18 Claims, 11 Drawing Sheets

FIG. 4
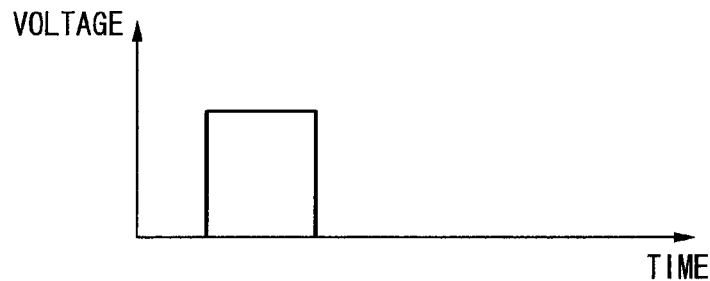
FIG. 5
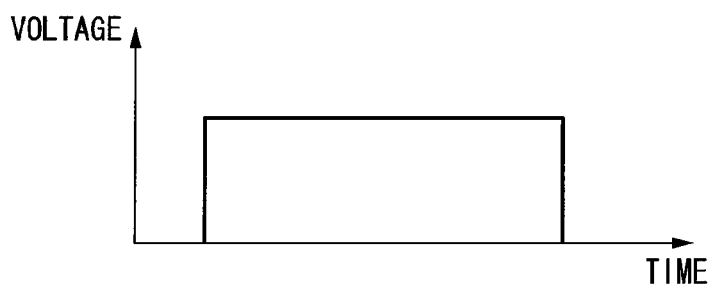
FIG. 6
| GAIN MODE CHANGE PROGRAM P1 |
| DYNAMIC RANGE CHANGE PROGRAM P2 |
| ZOOM PROGRAM P3 |
| REAL-TIME DISTANCE MEASUREMENT PROGRAM P4 |
| LIGHT ON/OFF PROGRAM P5 |
| LIGHT AMOUNT INCREASE PROGRAM P6 |
| : |
| SUBSTRATE ID | 0 1 2 3 |

NONDESTRUCTIVE TESTING SYSTEM

BACKGROUND

1. Technical Field

The present invention relates to a nondestructive testing system that tests a subject without causing damage.

2. Related Art

Generally, in nondestructive testing systems, the number of processes in an executable range can be increased by a method of upgrading (renewing) firmware (a program) stored in the nondestructive testing systems.

For example, in a configuration method of an apparatus disclosed in PCT Japanese Translation Patent Publication No. 2009-516844, at least part of data for upgrading the apparatus is provided by an insert such as a memory card which is removable from the apparatus.

Such an insert stores installation data to efficiently upgrade the apparatus, application and user data as a program that actually controls the apparatus, and a shutdown command to terminate the installation.

By connecting the insert to the apparatus, first, an application is executed in the apparatus, and the application and user data stored in the insert is copied to a memory of the apparatus.

Then, by executing the shutdown command, the upgrade of the apparatus is terminated.

Further, in recent years, in digital cameras and the like, it has been possible to download the program for the upgrade of the firmware through the Internet.

By installing the downloaded program in the digital camera, the digital camera is able to execute a new function such as white balance correction or noise reduction.

SUMMARY

According to an embodiment of the invention, a nondestructive testing apparatus is provided which includes: a storage section which stores a plurality of predetermined functions which are executable by the nondestructive testing apparatus, each of the predetermined functions being initially set to one of a permitted state and a disabled state; an input section which includes a plurality of input portions respectively corresponding to the predetermined functions; and a control section which is adapted to receive permission information including information which unlocks at least one of the predetermined functions initially set in the disabled state so as to be set to the permitted state. In the embodiment, the control section automatically assigns the at least one predetermined function which has been unlocked to the corresponding input portion of the input section.

BRIEF DESCRIPTION OF THE DRAWINGS

FIG. 4 is a diagram illustrating a waveform of a signal generated when performing a normal pushing operation on a joystick or the like of the operation section.

FIG. 5 is a diagram illustrating a waveform of a signal generated when performing a long pushing operation on the joystick or the like of the operation section.

FIG. 6 is a diagram illustrating a program and a substrate ID stored in a ROM of the endoscope apparatus.

DESCRIPTION OF EXEMPLARY EMBODIMENTS

Hereinafter, a nondestructive testing system according to a first embodiment of the invention will be described with reference to FIGS. 1 to 14.

The following description will be given of an example of a case in which the nondestructive testing system comprises an endoscope apparatus.

The endoscope apparatus, for example, tests an inner cavity of a subject such as a tubular object by using an image capturing unit or the like.

Figure 1:
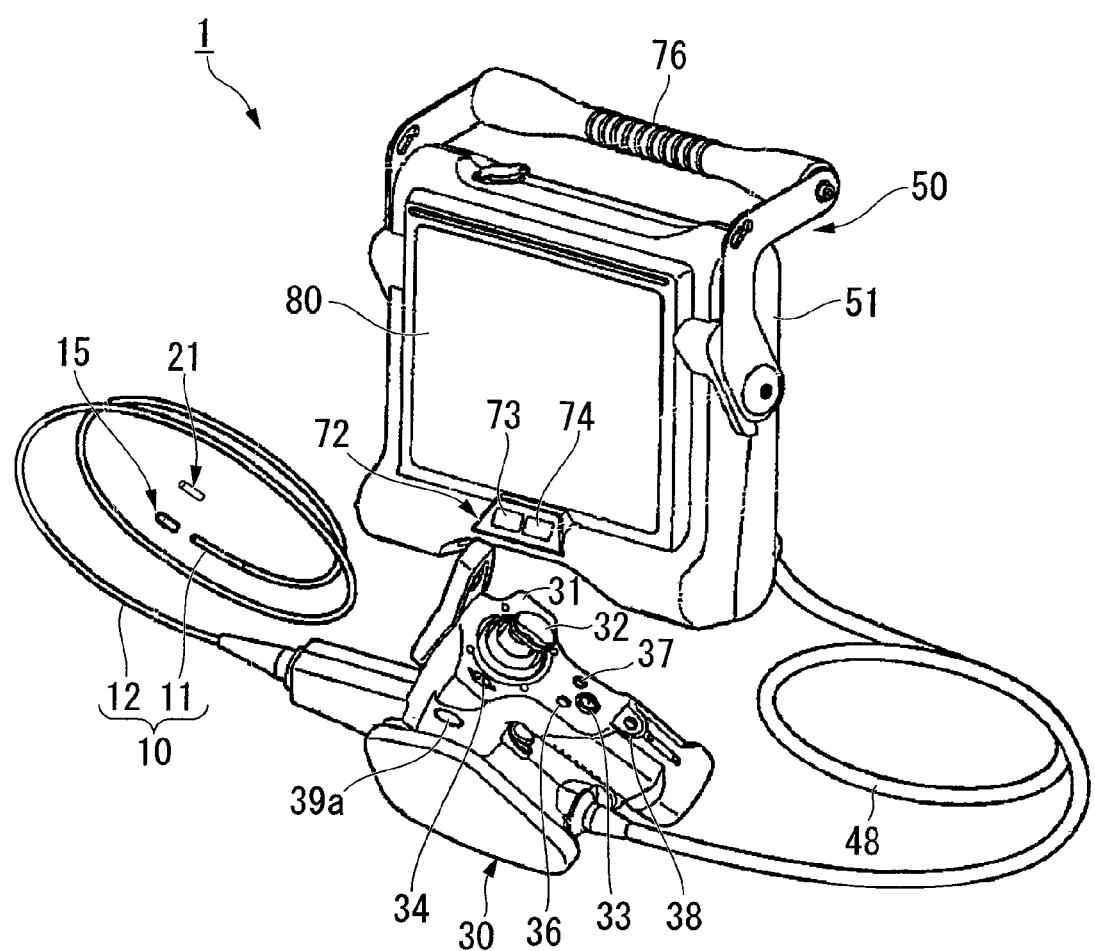
FIG. 1 is an overall view of an endoscope apparatus according to a first embodiment of the invention.
Figure 2:
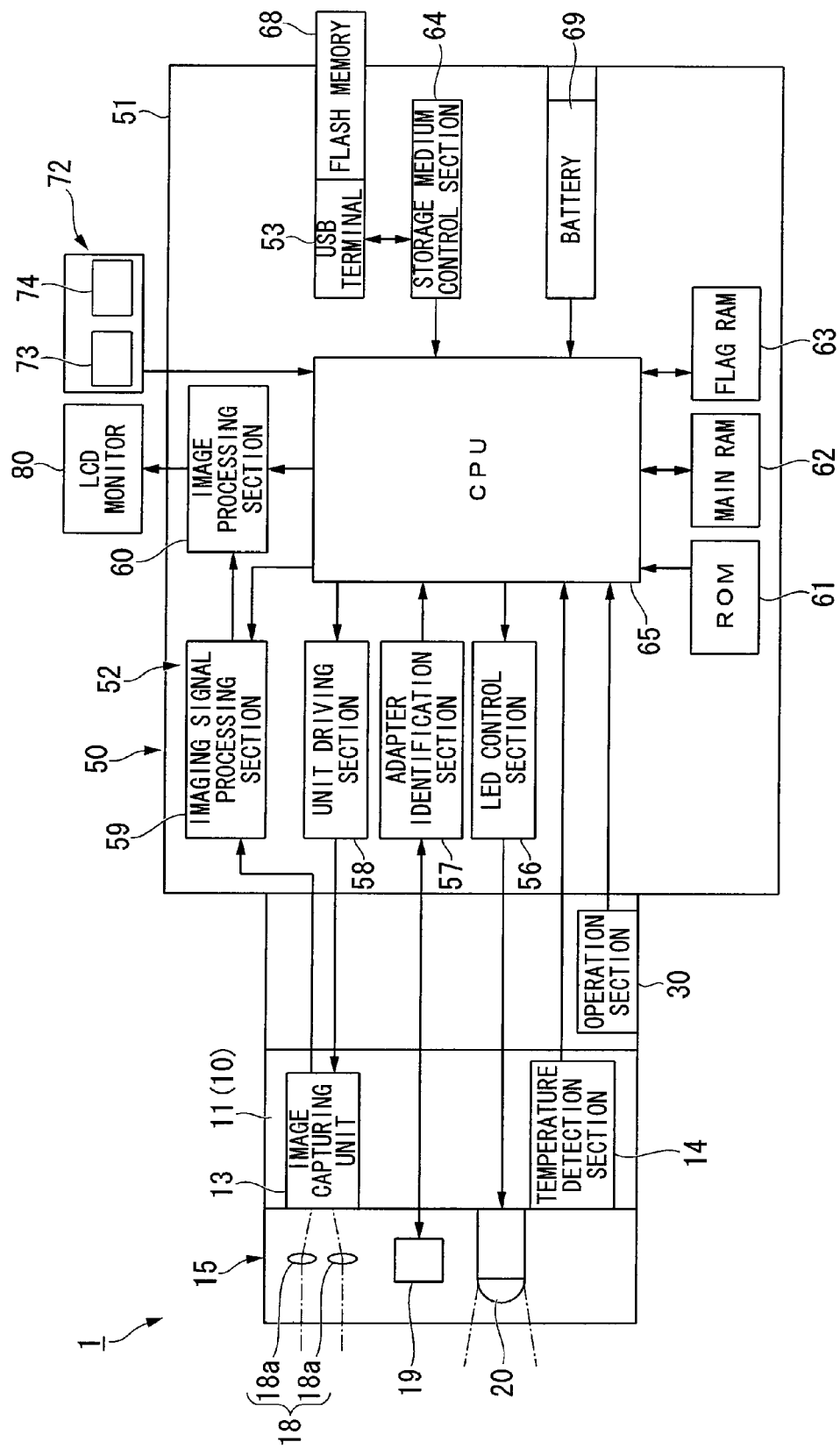
FIG. 2 is a block diagram of the endoscope apparatus.

As shown in FIGS. 1 and 2, an endoscope apparatus 1 according to an embodiment of the invention includes: an insertion section 10 which has a long length; an operation section 30 which is connected to the proximal end of the insertion section 10; a main body unit 50 which is connected to the operation section 30 through a universal cable 48; and an LCD monitor 80 which is disposed on the side of the main body unit 50.

The insertion section 10 comprises a bending portion 11 which is disposed on the distal end thereof and is configured to be bent, and a flexible tube portion 12 which is connected to the base end of the bending portion 11.

The bending portion 11 is configured to bend in an arbitrary direction with respect to an axial line of the insertion section 10 by operating the operation section 30.

An image capturing unit 13, which comprises a CCD (not shown), and a temperature detection section 14, which detects the temperature of the distal end of the insertion section at its own position, is disposed on the tip end surface of the bending portion 11 at the distal end of the insertion section, as shown in FIG. 2.

The image capturing unit 13 captures an image of light incident on the imaging surface of the CCD, and is able to output the captured image.

A direct viewing adapter 15 capable of observing the front side thereof is threadably and detachably mounted in the insertion section 10 (at the tip end of the bending portion 11).

The adapter 15 shown in FIG. 2 is an adapter for stereo measurement, and houses a stereo optical system including a lens unit 18 formed of two lens groups 18a, an electric resistor 19, and an LED 20.

The two lens groups 18a are arranged in a direction orthogonal to the axial line of the adapter 15 which has a substantially cylindrical shape.

Each lens group 18a is disposed so that the focus of the lens group 18a is positioned on the imaging surface of the CCD of the image capturing unit 13 when the adapter 15 is connected to the insertion section 10.

In addition, the endoscope apparatus 1 has a typical zoom function of enlarging and reducing the image acquired by the image capturing unit 13.

Moreover, when the adapter 15 is connected to the insertion section 10, an electric resistor 19 and an LED 20 are electrically connected to the main body unit 50, and the LED 20 is tightly attached to the temperature detection section 14. Thus, it is possible to detect the temperature of the LED 20.

As shown in FIG. 1, the endoscope apparatus 1 includes not only the adapter 15 for stereo measurement, but also a side-viewing adapter 21.

The side-viewing adapter 21 can be replaced with the adapter 15 so as to be connected to the insertion section 10.

The side-viewing adapter 21 also has an electric resistor (not shown), similarly to the above-described adapter 15.

The resistance value of the electric resistor of the side-viewing adapter 21 is set to be different from the resistance value of the electric resistor 19 of the adapter 15.

Figure 3:
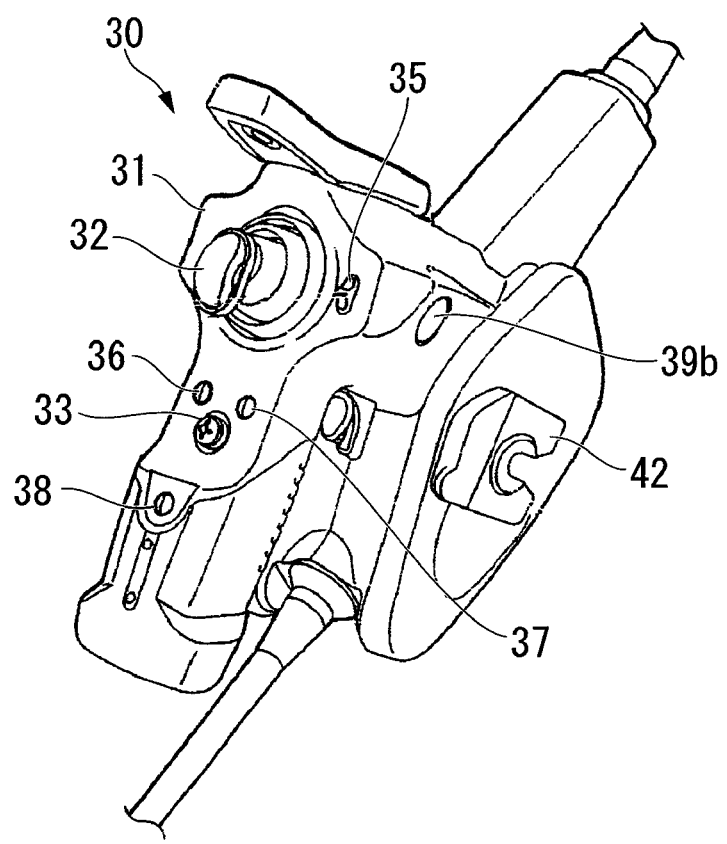
FIG. 3 is a perspective view of an operation section of the endoscope apparatus.

The operation section 30 includes, as shown in FIGS. 1 to 3: two joysticks (the input section) 32 and 33; two levers (the input section) 34 and 35; and three buttons (the input section) 36, 37, and 38 which are arranged on the surface of an operation section main body 31. In addition, the operation section also includes buttons (the input section) 39a and 39b disposed on the sides of the operation section main body 31 (hereinafter, the joystick 32 to the button 39b are referred to as "joystick 32 or the like").

The top end sides of joysticks 32 and 33 can be pivoted centering on the base ends thereof (the end portion close to the operation section main body 31).

The levers 34 and 35 are slidable in one direction (the distal/proximal end side direction) along the upper surface of the operation section main body 31.

Each of the joysticks 32 and 33 has at least one set of electric contacts, which are not shown, disposed therein.

An operator operates the joystick 32 or the like, and thereby it is possible to generate a signal waveform in which the time of shorting the one set of the electric contacts is comparatively short, as shown in FIG. 4. If the time of short circuit is, for example, less than one second, the operation of the joystick 32 or the like is referred to as a "normal pushing."

In addition, when the operator operates the joystick 32 or the like, it is possible to generate a signal waveform in which the time of shorting the one set of the electric contacts is comparatively long as shown in FIG. 5. If the time of short circuit is, for example, greater than or equal to two seconds, the operation of the joystick 32 or the like is referred to as a "long pushing."

As the operator moves the top end side of the joystick 32, the bending portion 11 is bent.

The functions of the joystick 33, the levers 34 and 35, and the buttons 36, 37, 38, 39a, and 39b will be described later.

Further, as shown in FIG. 3, the operation section main body 31 is equipped with a hanger 42 for hanging the operation section 30 on the main body unit 50.

As shown in FIGS. 1 and 2, the main body unit 50 has a casing 51 which has a substantially box shape, and a control section 52 and a USB terminal 53 which are disposed in the casing 51.

As shown in FIG. 2, the control section 52 includes: an LED control section 56; an adapter identification section 57; a unit driving section 58; an imaging signal processing section (an adjustment section) 59; an image processing section 60; a ROM (a storage section) 61; a main RAM 62; a flag RAM (a restriction section) 63; a storage medium control section 64; and a CPU (a calculation section) 65.

The LED control section 56 controls a voltage applied to the LED 20.

The adapter identification section 57 applies a certain voltage to the electric resistor of the adapter connected to the insertion section 10, and at this time, detects the value of the current flowing to the electric resistor. In this way, the adapter identification section 57 is capable of detecting the type of the adapter connected to the insertion section 10.

The unit driving section 58 supplies the predetermined electric power to the image capturing unit 13, and controls the image capturing unit 13.

The imaging signal processing section 59 is able to calculate a distance from the tip end of the adapter 15 to the subject based on a deviation between images of the subject formed by the two lens groups 18a in one picture image by stereo measurement using the adapter 15.

Further, the imaging signal processing section 59 is provided with an adjustment tool (not shown), and is thus able to perform typical image processing by adjusting ranges of the dynamic range values and gain values of the image and the dynamic image acquired by the image capturing unit 13 in a predetermined range.

The ranges of the dynamic range values and the gain values are set values used in the image processing, and by adjusting each value and each range, the luminance distribution or the like of the image or the dynamic image is adjusted independently.

The image processing section 60 is able to create an image which is obtained by superimposing additional information, such as the type of adapter and the distance to the subject, upon the image acquired by the image capturing unit 13.

The ROM 61 stores a plurality of programs which comprise firmware such that the programs are not removable or erasable by a user.

As shown in FIG. 6, the ROM 61 stores program codes such as a gain mode change program (the first program) P1, a dynamic range change program (the second program) P2, a zoom program (the first program) P3, a real-time distance measurement program (the second program) P4, a light on/off program (the first program) P5, and a light amount increase program (the second program) P6 which will be described later.

Further, in order to distinguish the control section 52 of the endoscope apparatus 1 from the control section of a different endoscope apparatus 1, the ROM 61 stores a different substrate ID unique to the endoscope apparatus 1. The substrate ID is a unique identification symbol, which is different for each machine even if the type of each endoscope apparatus 1 is the same.

The main RAM 62 and the flag RAM 63 of the embodiment employ non-volatile memory units which are rewritable.

When the endoscope apparatus 1 is activated, the main RAM 62 temporarily stores the above-mentioned programs P1 to P6, and stores the image or the like acquired by the image capturing unit 13.

Figure 7:
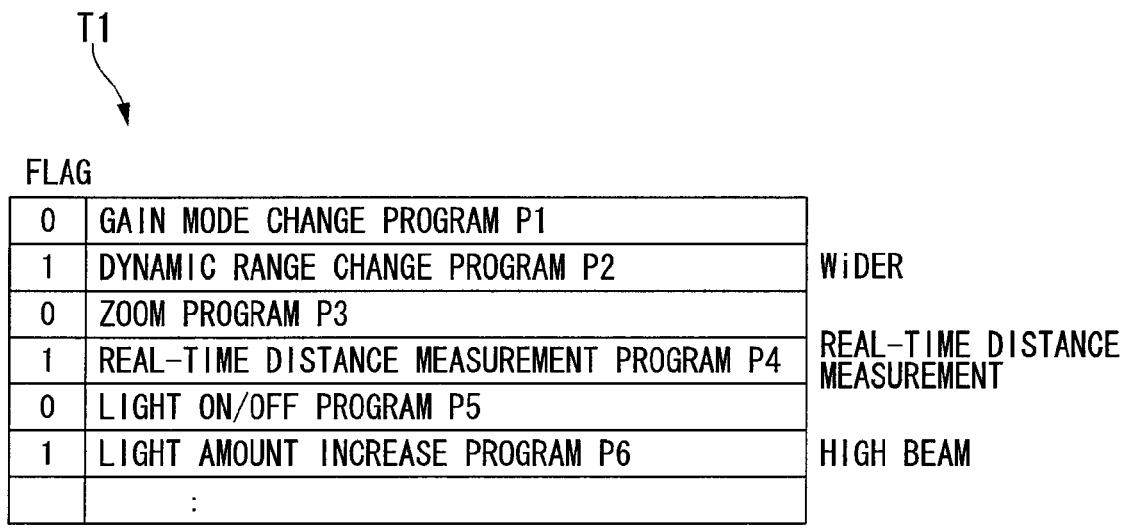
FIG. 7 is a diagram illustrating a table stored in a flag RAM of the endoscope apparatus.

The flag RAM 63 stores a table T1 which represents whether each program stored in the ROM 61 is in the permission state where the execution thereof is permitted or in the restriction state where the execution thereof is restricted on the basis of the values of the flags as shown in FIG. 7.

In FIG. 7, the program, for which "0" is noted in the column of the flag, is in the permission state.

In FIG. 7, the program, for which "1" is noted in the column of the flag, is in the restriction state.

By changing the values of the flags, it is possible to switch the respective programs P1 to P6 between the permission state and the restriction state.

In addition, the values of the flags in the table T1 of FIG. 7 are values set in a time-of-shipping state (an initial state) of the endoscope apparatus 1.

As shown in FIG. 2, the storage medium control section 64 is connected with the USB terminal 53.

The storage medium control section 64 is able to read the data stored in the flash memory (the storage medium) 68 or the like detachably connected to the USB terminal 53. While a USB terminal is used in the present embodiment, it should be recognized that one having ordinary skill in the art may alternately employ various different connection devices, such as a serial port, optical drive, floppy drive, network port (i.e. Ethernet), and the like. Wireless connections are also understood to fall within the scope of the present invention.

Figure 8:
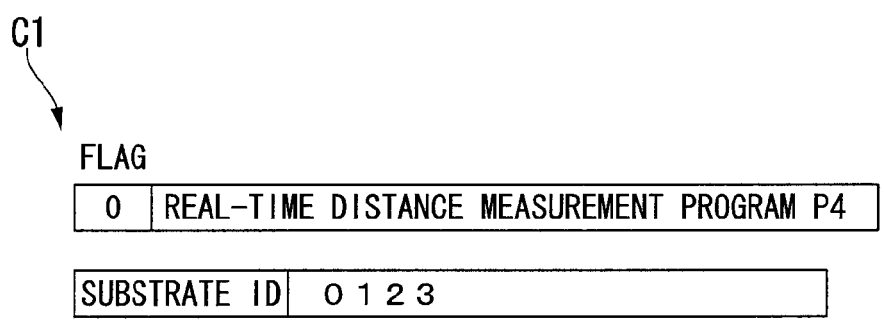
FIG. 8 is a diagram illustrating data stored in a flash memory of the endoscope apparatus.

As shown in FIG. 8, the flash memory 68 of the present embodiment stores the substrate IDs and the permission command C1 which switches a real-time distance measurement program P4 from the restriction state to the permission state.

The permission command C1 includes the value of the flag in which "0" is noted and the name of the program (in the embodiment, a "real-time distance measurement program P4") which is switched to the permission state.

The CPU 65 is, as shown in FIG. 2, electrically connected with the LED control section 56, the unit driving section 58, the imaging signal processing section 59, (which are hereinafter referred to as the "LED control section 56 or the like"), the adapter identification section 57, the ROM 61, the main RAM 62, the flag RAM 63, and the storage medium control section 64.

The CPU 65 reads the data from the ROM 61, controls the LED control section 56 or the like, and reads and writes data from and in the main RAM 62 and the flag RAM 63.

The CPU 65 reads the values of the flags representing classification of the permission/restriction state recorded in the table T1 of the flag RAM 63, and on the basis of the read flag values, executes the programs which are set to the permission state.

A battery 69 is configured to be detachable from the casing 51, and supplies electric power to the LED control section 56, the unit driving section 58, the CPU 65, the LCD monitor 80, and the like.

As shown in FIGS. 1 and 2, the LCD monitor 80 is disposed on the side of the casing 51, and is connected to the above-mentioned image processing section 60.

As described later, when the endoscope apparatus 1 is activated and a certain time necessary to initialize the apparatus has passed, the control section 52 activates a LIVE mode, thereby displaying the dynamic image and the like, which are captured by the image capturing unit 13, on a display screen of the LCD monitor 80.

A front panel 72 is mounted on the portion adjacent to the LCD monitor 80 on the side of the casing 51.

A power supply button (the input section) 74 and a LIGHT button (the input section) 73 changing the voltage applied to the LED 20 are disposed in the front panel 72.

Further, on the outer surface of the casing 51, there is provided a handle 76 for moving the main body unit 50 (refer to FIG. 1), and a hanger receiving portion (not shown) for hanging the operation section 30 on the main body unit 50 by engaging with the hanger 42 of the operation section 30.

The above-mentioned joystick 33, the levers 34 and 35, and the buttons 36, 37, 38, 39a, and 39b will be described one after another.

As shown in FIGS. 1 and 3, the button 36 is disposed on the left lower side of the joystick 32 which is disposed at substantially the center of the surface of the operation section main body 31. The button 36 is also called a MENU/EXIT button.

When the control section 52 keeps the LIVE mode active, if the operator performs the normal pushing operation on the button 36, then the control section 52 switches the mode to a MENU mode for performing various settings.

In this state, the operator further performs the normal pushing operation on the button 36, and thus the control section 52 switches the mode to the LIVE mode again.

The button 37 is disposed on the right lower side of the joystick 32, and is also called a LIVE/GAIN button.

When the control section 52 keeps the MENU mode active, if the operator performs the normal pushing operation on the button 37, then the control section 52 switches the mode to the LIVE mode by executing a gain mode change program P1.

In addition, when the control section 52 keeps the LIVE mode active, if the operator performs the normal pushing operation on the button 37, then a dynamic range change program P2 is executed.

However, when the dynamic range change program P2 is set to the restriction state by using the flag RAM 63 (refer to FIG. 7), the dynamic range change program P2 is not executed.

When the control section 52 is activated, the gain mode change program P1 adjusts the gain value of the imaging signal processing section 59 in a GAIN1 mode.

In addition, whenever the operator performs the long pushing operation on the button 37, a setting condition of the gain value is alternately switched among three modes of GAIN1, GAIN2, and AUTO.

Figure 9:
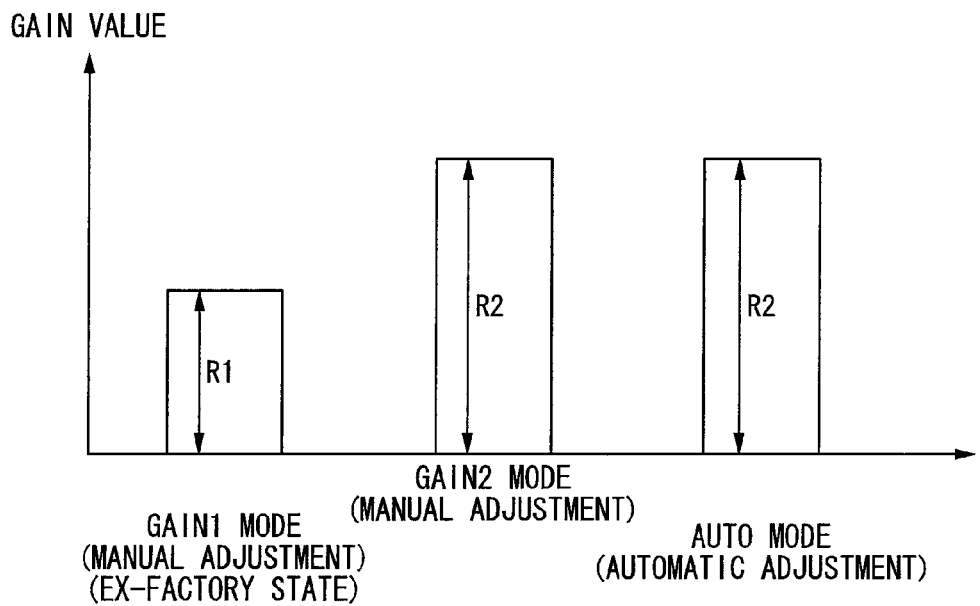
FIG. 9 is a diagram illustrating adjustable ranges of gain values of respective modes in the endoscope apparatus.

In the GAIN1 mode and the GAIN2 mode, when the operator performs the normal pushing operation on the button 37, as shown in FIG. 9, the operator is able to adjust the gain value in certain ranges R1 and R2.

The range R2 of the gain value, which can be adjusted in the GAIN2 mode, is set to be larger than the range R1 of the gain value which can be adjusted in the GAIN1 mode.

The lower limits and the upper limits of the gain values are as follows.

Specifically, the lower limits of the gain values are set to be the same in the range R2 and the range R1. In addition, the upper limits of the gain values are set so that the upper limit of the range R2 is larger than the upper limit of the range R1.

In the AUTO mode, the gain value is automatically adjusted in the range R2 by the imaging signal processing section 59.

Figure 10:
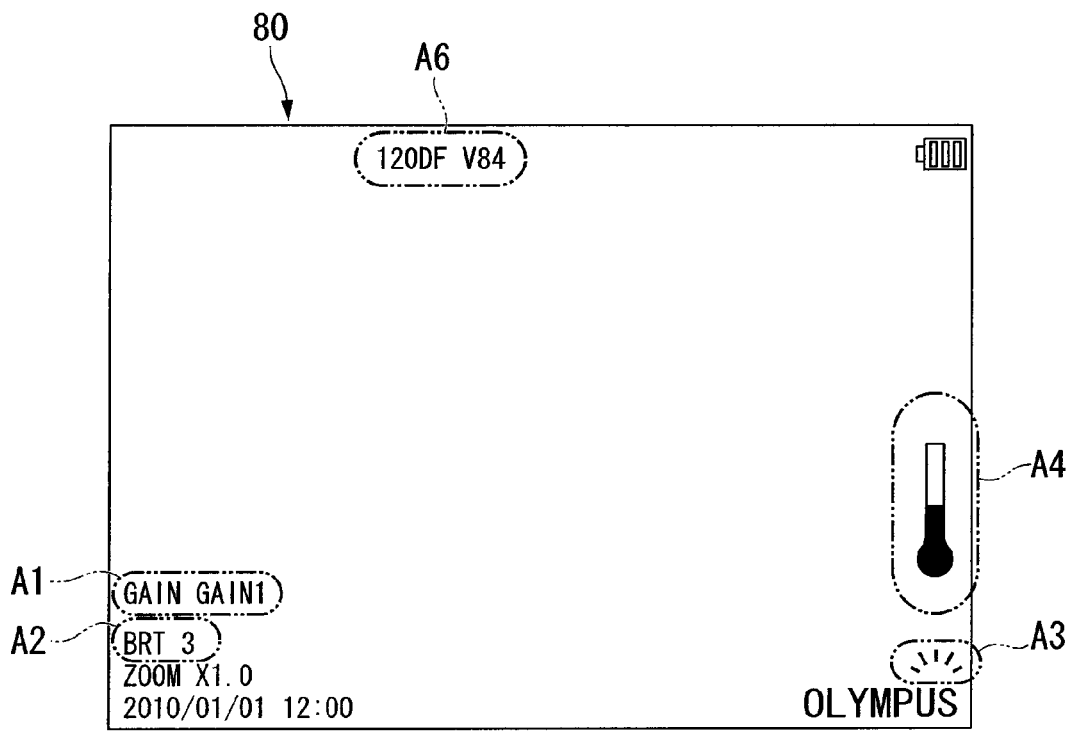
FIG. 10 is a diagram illustrating content displayed on a LCD monitor of the endoscope apparatus.

In addition, when the gain mode is switched, as shown in FIG. 10, the currently set gain mode (which is set as the GAIN1 mode in FIG. 10) is displayed in an area A1 near the center on the left side of the display screen of the LCD monitor 80 for a predetermined time. It is recognized that the area A1 may be alternately displayed in an area other than the lower left side of the display screen of the LCD monitor 80.

Figure 11:
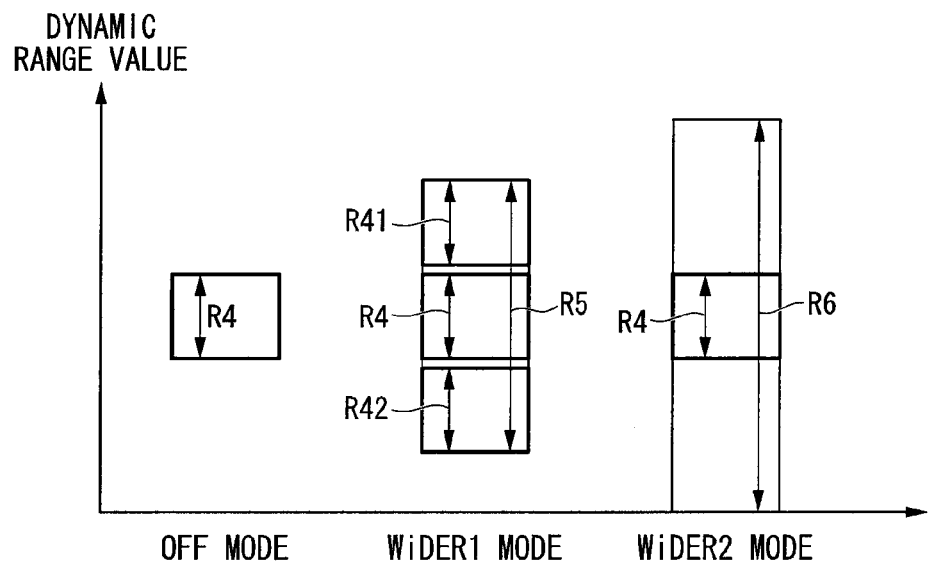
FIG. 11 is a diagram illustrating adjustable ranges of ranges of dynamic range values of the respective modes in the endoscope apparatus.

When the dynamic range change program P2 is not executed, the range of the dynamic range value due to the imaging signal processing section 59 is set in a mode (an OFF mode) in which the range thereof can be adjusted only in the range (the first range) R4, as shown in FIG. 11.

The method of executing the dynamic range change program P2 is as follows. The flag corresponding to the gain mode change program P1 stored in the flag RAM 63 is set to "1", thereby switching the gain mode change program P1 from the permission state to the restriction state. In addition, the flag corresponding to the dynamic range change program P2 is set to "0", thereby switching the dynamic range change program P2 from the restriction state to the permission state.

When the dynamic range change program P2 is executed and the gain mode change program P1 is not executed, the range of the dynamic range value is set in the OFF mode.

The setting condition of the range of the dynamic range value is alternately switched among three modes of OFF, WiDER1, and WiDER2 whenever the long pushing is performed on the button 37.

In addition, in the three modes relating to the range of the dynamic range value, the actual gain value can be adjusted through the above-mentioned AUTO mode.

As shown in FIG. 11, in the WiDER1 mode, the range of the dynamic range value has the same width as the range R4. However, the range of the dynamic range value can be shifted (adjusted) so that the median of the range of the dynamic range value is changed with the width kept constant, within the range (the second range) R5 larger than the range R4.

In the WiDER1 mode, the lower limit of the range R5 is smaller than the lower limit of the range R4, and the upper limit of the range R5 is larger than the upper limit of the range R4. Accordingly, the range R5 includes the range R4, and is larger than the range R4.

In the range R5, for example, the range R4 of the dynamic range can be adjusted to the range R41 by increasing the median thereof, and can be adjusted to the range R42 by decreasing the median thereof.

Likewise, in the WiDER2 mode, the range of the dynamic range value has the same width as the range R4. However, the range of the dynamic range value can be shifted (adjusted) so that the median of the range of the dynamic range value is changed while the width is kept constant, within the range R6 larger than the range R5.

In the WiDER2 mode, the lower limit of the range R6 is smaller than the lower limit of the range R5, and the upper limit of the range R6 is larger than the upper limit of the range R5. Accordingly, the range R6 includes the range R5, and is larger than the range R5.

In the WiDER1 mode and the WiDER2 mode, the range of the dynamic range value can be adjusted by performing the normal pushing operation on the button 37.

By switching to the WiDER1 mode and the WiDER2 mode so as to make the range of the dynamic range value adjustable, it is possible to adjust the dynamic image and the like, which are displayed on the display screen of the LCD monitor 80, to be brighter.

In addition, the function of making the range of the dynamic range value adjustable is hereinafter referred to as a "WiDER function".

As shown in FIGS. 1 and 3, the joystick 33 is disposed on the lower side of the buttons 36 and 37 on the surface of the operation section main body 31, and is called a MEAS(MEA-SURE)/ENTER button.

In the MENU mode, the operator is able to select a menu by moving the top end side of the joystick 33, and thus it is possible to determine the selected menu by pushing the joystick 33 into the operation section main body 31 side.

The buttons 39a and 39b are called FRZ (FREEZE)/REC buttons.

The operator may push any of the buttons 39a and 39b, and thereby it is possible to store the image, which is acquired by the image capturing unit 13, in the main RAM 62.

The button 38, which is disposed on the lower side of the joystick 33, is called a VIEW button.

By pushing the button 38, the operator is able to allow the display screen of the LCD monitor 80 to display a list of the images stored in the main RAM 62 in a reduced manner or to display the stored images.

The lever 34 is disposed on the left side of the joystick 32, and is called a BRT lever.

When the LIVE mode is active, if the operator slides the lever 34 frontward, the brightness of the entire display screen of the LCD monitor 80 is increased.

When the LIVE mode is active, if the operator slides the lever 34 rearward, the brightness of the entire display screen of the LCD monitor 80 is decreased.

In addition, if the operator adjusts the brightness of the display screen of the LCD monitor 80 by using the lever 34, as shown in FIG. 10, the currently set brightness is displayed in an area A2 on the lower side of the area A1 of the LCD monitor 80 during a predetermined time (for example, in FIG. 10, brightness BRT is set to 3). It is recognized that the area A2 may be alternately displayed in any desired area on the LCD monitor 80.

The lever 35 is, as shown in FIG. 3, disposed on the right side of the joystick 32, and is referred to as a ZOOM lever.

When the control section 52 keeps the LIVE mode active, if the lever 35 is slid frontward or rearward, a zoom program P3 (refer to FIG. 6) is executed.

The zoom program P3 is able to enlarge and reduce the image, which is acquired by the image capturing unit 13, by using the above-mentioned zoom function.

In addition, as the operator slides the lever 35, the same operation (input) that executes the zoom program P3 is performed, thereby executing the real-time distance measurement program P4 (refer to FIG. 6).

However, when the real-time distance measurement program P4 is set to the restriction state by the flag RAM 63 (refer to FIG. 7), the real-time distance measurement program P4 is not executed.

When the real-time distance measurement program P4 is executed, while the operator slides the lever 35, the imaging signal processing section 59 continuously performs the stereo measurement. Thereby, the distances to the distance measurement positions, which are set ahead of the adapter 15, are sequentially displayed on the display screen of the LCD monitor 80.

The function of sequentially displaying the measured distances is hereinafter referred to as a "real-time distance measurement function".

The measurement precision of the stereo measurement is guaranteed when the distance between the subject and the adapter 15 at the stereo measurement is within a regular range.

When the zoom program P3 is executed, the real-time distance measurement program P4, of which the execution result is associated with that of the zoom program P3, is executed, and thereby it is possible to sequentially display the measured distance on the display screen of the LCD monitor 80. Accordingly, by viewing the distance information together with the image displayed on the display screen of the LCD monitor 80, the operator is able to check whether or not the displayed image is an image at the distance within the measurement range in which the precision is guaranteed, at any time.

Here, the term "the execution result is associated" indicates that one execution result is obtained by further adding additional information to the initial execution result, That is, the adjustable range or the number of the adjustment steps with respect to a predetermined function is increased, thereby increasing the test level of the subject.

In the real-time distance measurement program P4, additional information with respect to the precision of the distance in the acquired image is added to the image which is enlarged or reduced by the zoom program P3.

Subsequently, description will be given of a LIGHT button 73 and a power supply button 74 disposed on the front panel 72 of the main body unit 50.

Each of the LIGHT button 73 and the power supply button 74 is provided with a respective set of electric contacts (not shown).

As the operator performs the normal pushing operation on the power supply button 74, it is possible to alternately switch between an inactivation state, in which electric power supply from the battery 69 is stopped, with an activation state, in which electric power is supplied from the battery 69 to the LED control section 56, the CPU 65, and the like, thereby activating the endoscope apparatus 1.

As the operator performs the normal pushing operation on the LIGHT button 73, the light on/off program P5 is executed.

The light on/off program P5 is able to alternately switch between the light-off state, in which the LED 20 is turned off, and the normal light-on state, in which the LED 20 is turned on, by driving the LED control section 56.

In addition, when the LED 20 is turned on, if the operator performs the long pushing operation on the LIGHT button 73, then the light amount increase program P6 (refer to FIG. 6) is executed.

The light amount increase program P6 puts the LED 20 into a high-intensity light-on state where the amount of the light irradiated from the LED 20 is increased by allowing LED control section 56 to apply a voltage which is higher than that in the normal light-on state of the LED 20.

Further, in the high-intensity light-on state, the operator performs the long pushing operation on the LIGHT button 73, the LED 20 returns to the normal light-on state.

However, when the light amount increase program P6 is set to the restriction state by using the flag RAM 63 (refer to FIG. 7), the light amount increase program P6 is not executed.

The LIGHT button 73 assists the operator to perform the following different operations: one is the normal pushing operation of the LIGHT button 73 for executing the light on/off program P5; and the other is the long pushing operation of the LIGHT button 73 for executing the light amount increase program P6.

In addition, hereinafter, the function of increasing the light amount of the LED 20 is referred to as a "high beam function."

In the time-of-shipping state (initial state), the LED 20 can be operated by use of the LIGHT button 73 in two steps of the normal light-on state and the light-off state.

After the light amount increase program P6 is set to the permission state and is executed, by use of the LIGHT button 73, the LED 20 can be operated in three steps of the normal light-on state, the high-intensity light-on state, and the light-off state.

Further, as shown in FIG. 10, when the LED 20 is operated in the high-intensity light-on state, an icon is displayed in an area A3 on the lower right side of the display screen of the LCD monitor 80 for a predetermined amount of time. The area A3 may be alternately provided elsewhere on the LCD monitor 80.

The temperature condition (change) detected by the temperature detection section 14 is displayed in an area A4 above the area A3 on the display screen of the LCD monitor 80 by using an operation icon having substantially a thermometer shape. It is noted that the area A4 may be provided elsewhere on the LCD monitor 80. In addition, it should be recognized that not only a thermometer shape may be used for the operation icon representing the temperature detection section, but any other appropriately shaped icon may be provided. In the present invention, the operation icon is not limited to pictures, and as used herein the term icon can alternately refer to characters, words, or symbols, in addition to pictorial icons.

With respect to such operation icons, the operation icons which correspond to respective features of the endoscope apparatus 1 may initially be set to one of a display state and non-display state for display on the LCD monitor 80. The display state of an initially locked function, which is initially set to the non-display state, may be set to the display state when the function is unlocked by the permission command C1. The display screen of the LCD monitor 80 only displays operation icons with respect to functions which are set to the display permission state, and does not display operation icons with respect to any of the functions which remain in the non-display state. That is, the display section of the LCD monitor 80 displays operation icons which are initially set to the display permission state, as well as operation icons which were initially set to the non-display state but which have been unlocked to be in the display permission state.

In addition, the temperature, which is detected by the temperature detection section 14, may be higher than a predetermined first warning temperature set in advance in the ROM 61. In this case, in order to alert the operator, the operation icon is indicated by a yellow color.

Figure 12:
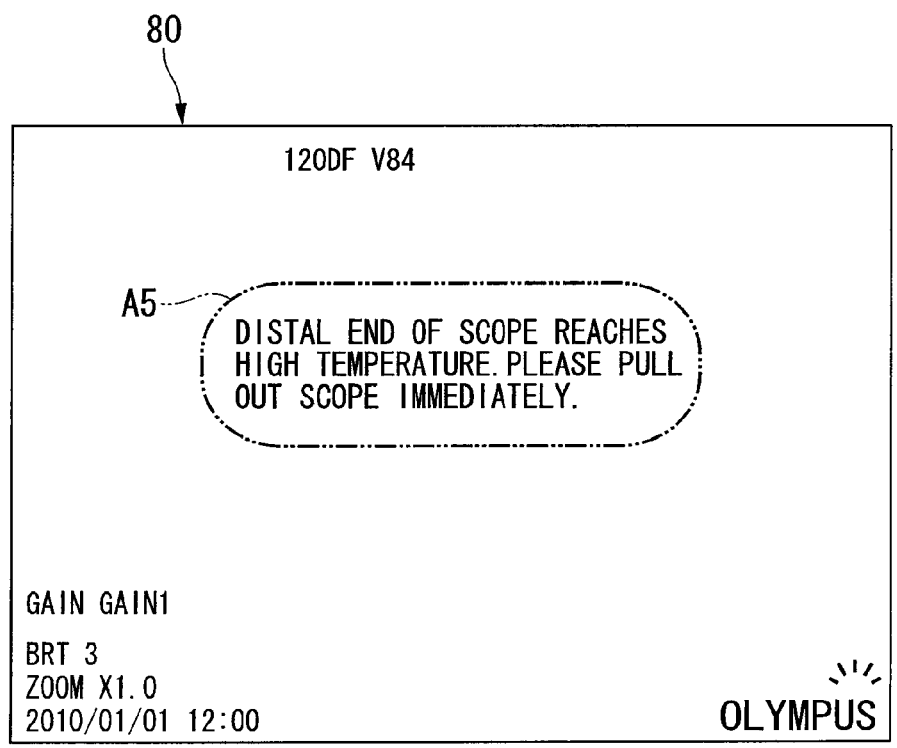
FIG. 12 is a diagram illustrating content displayed on a LCD monitor of the endoscope apparatus.

The temperature, which is detected by the temperature detection section 14, may exceed the second warning temperature which is higher than the first warning temperature. In this case, the CPU 65 displays, as shown in FIG. 12, a message alerting the operator in an area A5 of the central portion on the display screen of the LCD monitor 80, or in another portion of the LCD monitor 80.

The function of displaying the message is hereinafter referred to as a "temperature alert function".

In addition, the message is preferably indicated by a red color on the LCD monitor 80 in order to alert the operator more effectively.

Further, when the message is displayed, additionally an alarm may be sounded.

The type of the adapter, which is detected by the above-mentioned adapter identification section 57, is displayed in an area A6 on the upper side of the display screen of the LCD monitor 80 shown in FIG. 10, or on another area of the LCD monitor 80.

The function of displaying the type of the adapter is hereinafter referred to as an "adapter type display function".

The temperature alert function and the adapter type display function are restricted by the flag RAM 63 so as not to be executed in the time-of-shipping state (alternately referred to as the initial state).

As described above, the five functions of the temperature alert function, the adapter type display function, the high beam function, the WiDER function, and the real-time distance measurement function (hereinafter referred to as the "temperature alert function or the like"), are set to the restriction state so as not to be executed in the time-of-shipping state.

Next, description will be given of a method of testing an inner cavity of a subject by using the endoscope system 1 configured as described above.

In addition, in the following description, since the flash memory 68 is provided from the manufacturer of the endoscope system 1 in accordance with the demand of the operator, it is assumed that originally the flash memory 68 is not provided to the endoscope system 1.

In the case of the endoscope apparatus 1 which is set to the time-of-shipping state, the operator selects an adapter depending on the subject, and, for example, connects the adapter 15 to the insertion section 10.

If the operator performs the normal pushing operation on the power supply button 74, electric power is supplied from the battery 69 to the LED control section 56, the CPU 65, or the like, and the endoscope apparatus 1 becomes activated.

The CPU 65 reads the programs P1 to P6 and the substrate ID which are stored in the ROM 61 and the table T1 which is stored in the flag RAM 63, and retains those in the main RAM 62.

Figure 13:
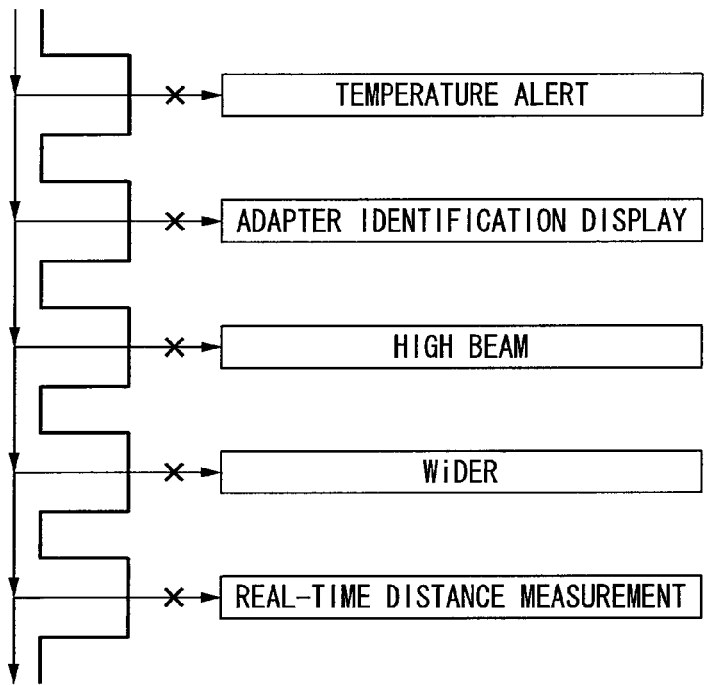
FIG. 13 is a diagram illustrating a procedure in which a CPU of the endoscope apparatus checks executable functions.

At this time, the CPU 65 checks whether or not it is possible to execute the temperature alert function or the like, as shown in FIG. 13, from the setting condition of the permission/restriction state of each program P1 to P6 recorded in the table T1.

In this example, the functions of the temperature alert function or the like become impossible to execute (restriction state).

However, the above-mentioned gain mode change program P1, the zoom program P3, the light on/off program P5, or the like are executed (permission state).

As described above, when the initialization of the control section 52 is terminated, the control section 52 activates the LIVE mode. Then, the dynamic image, which is acquired by the image capturing unit 13, is processed through the imaging signal processing section 59 and the image processing section 60, and is thus displayed on the display screen of the LCD monitor 80.

At this time, the imaging signal processing section 59 is set to the GAIN1 mode, and thus the adjustable range of the gain value corresponds to the range R1 shown in FIG. 9.

When the initialization is terminated, the CPU 65 detects the type of the adapter by using the adapter identification section 57 at predetermined time intervals, and detects the temperature of the distal end of the insertion section 10 by using the temperature detection section 14, thereby displaying the detection results on the display screen of the LCD monitor 80.

The operator puts the LED 20 into the normal light-on state by performing the normal pushing operation on the LIGHT button 73, and inserts the insertion section 10 into the inner cavity of the subject while bending the bending portion 11 by using the joystick 32 of the operation section 30.

Adjustment for making the entire display screen of the LCD monitor 80 brighter or darker is performed by sliding the lever 34 (the BRT lever).

In addition, adjustment for enlarging or reducing the dynamic image displayed on the LCD monitor 80 is performed by the lever 35 (the ZOOM lever).

In addition, an image of the inner cavity of the subject is acquired from a desired position by pushing the button 39*a* (the FRZ/REC button), and this image is stored in the main RAM 62.

In such a manner, after observing the inner cavity of the subject, the operator pulls out the insertion section 10 from the subject.

Next, description will be given of a case of adding the real-time distance measurement function for enlarging and reducing the dynamic image to the endoscope apparatus 1.

First, the operator requests the flash memory 68 to add the real-time distance measurement function for enlarging and reducing the dynamic image to the endoscope apparatus 1 from the manufacturer of the endoscope apparatus 1.

The manufacturer sends, to the operator, the flash memory 68 which stores the data of the unique substrate ID of the endoscope apparatus 1 used by the operator and the permission command C1 shown in FIG. 8.

At this time, the manufacturer may send, together with the flash memory 68, an indicator such as an identification seal representing that the function added to the endoscope apparatus 1 is the real-time distance measurement function, and may recommend an operator to attach the identification seal to the endoscope apparatus 1 to which the function is added.

If the operator connects the flash memory 68 sent from the manufacturer to the USB terminal 53, the CPU 65 reads the data of the substrate ID of the endoscope apparatus 1 used by the operator and the permission command C1 of the flash memory 68 through the storage medium control section 64.

In addition, the CPU 65 checks that the substrate ID stored in the flash memory 68 is the same as the substrate ID stored in the ROM 61, and then executes the permission command C1 to write "0" into the value of the flag corresponding to the real-time distance measurement program P4 in the table T1 of the flag RAM 63 shown in FIG. 7.

As a result, the real-time distance measurement program P4 of the endoscope apparatus 1 upgraded by the operator is put into the permission state.

Figure 14:
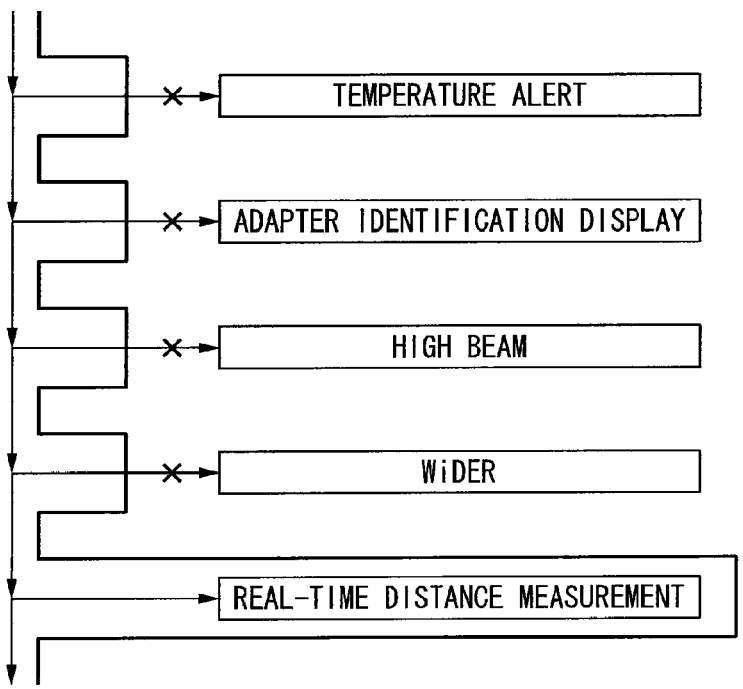
FIG. 14 is a diagram illustrating a procedure in which a CPU of the endoscope apparatus checks executable functions.

At this time, the CPU 65 checks whether or not it is possible to execute the temperature alert function or the like, from the setting condition of the permission/restriction state recorded in the table T1. Then, as shown in FIG. 14, the CPU 65 detects that the real-time distance measurement function can be executed among the five functions of the temperature alert function or the like.

In addition, if the substrate ID stored in the flash memory 68 is different from the unique substrate ID of the endoscope apparatus 1 stored in the ROM 61, the CPU 65 does not execute the permission command C1.

When the real-time distance measurement function is added, if the operator slides the lever 35, the dynamic image, which is acquired by the image capturing unit 13, is enlarged or reduced, and the distances (the distances between the subject and the adapter at the stereo measurement) from the distal end of the insertion section to the distance measurement positions are sequentially displayed on the display screen of the LCD monitor 80.

In some typical digital cameras, in order to execute a new function, it may be necessary to install a program and then perform a setting for assigning the new function to a button operation of the digital camera by operating the menu button (the input section) of the digital camera.

In this case, until the new function can be executed in practice, it is necessary to perform two steps of (i) installing the program and (ii) assigning the function to the button operation. Accordingly, there is a problem in that the upgrade operation becomes complicated.

According to the endoscope system 1 of the embodiment, in the time-of-shipping state, in the zoom program P3 and the real-time distance measurement program P4 stored in the ROM 61, the real-time distance measurement program P4 is set to the restriction state by using the flag RAM 63.

Hence, if only the setting of the real-time distance measurement program P4 in the flag RAM 63 is changed from the restriction state to the permission state, by sliding the lever 35 (the ZOOM lever), it is possible to execute the real-time distance measurement program P4.

Accordingly, if only the state of the real-time distance measurement program P4 is changed, the input for executing the real-time distance measurement program P4 can be automatically assigned to the lever 35. Thus, in order to execute the real-time distance measurement program P4 each time, it is not necessary for the operator himself to perform the setting on the lever 35.

As described above, as the real-time distance measurement program P4 is switched to the permission state in terms of software, it is possible to assign the input for executing the real-time distance measurement program P4 to the lever 35.

Further, the sliding of the lever 35 is common between the operation for executing the zoom program P3 and the operation for executing the real-time distance measurement program P4.

Hence, by sliding the lever 35, the operator is able to execute the zoom program P3 and the real-time distance measurement program P4 simultaneously.

The gain mode change program P1 is to set the range of the dynamic range value due to the imaging signal processing section 59 in the OFF mode in which the range thereof can be adjusted only in the range R4. In addition, the dynamic range change program P2 is to set the adjustable range of the range of the dynamic range value to the range R5 or the range R6.

In addition, the CPU 65 switches the gain mode change program P1 into the restriction state, and switches the dynamic range change program P2 into the permission state, thereby executing the WiDER function.

By executing the dynamic range change program P2, the adjustable range of the gain value at the time of performing the normal pushing operation on the button 37 (the LIVE/GAIN button) extends from the range R4 as the unadjustable range of the OFF mode to the range R5 or the range R6 which is larger than the range R4.

When the same operation is performed, the adjustable range of the gain value is increased. Therefore, it is possible to execute the dynamic range change program P2 without disturbing the operability for the operator.

Further, the normal pushing operation for executing the light on/off program P5 and the long pushing operation for executing the light amount increase program P6 are commonly performed on the LIGHT button 73, but those are different operations.

Hence, it is possible to execute the light on/off program P5 and the light amount increase program P6 independently.

The permission command C1 is stored in the flash memory 68, and thus the permission command C1 is executed when the flash memory 68 is connected to the storage medium control section 64. Accordingly, it is possible to easily issue the permission command C1 to the CPU 65.

Further, the execution result of the zoom program P3 is associated with the execution result of the real-time distance measurement program P4.

Hence, it is possible to increase the number of programs executable without disturbing the operability for the operator.

Since the substrate ID is stored in the flash memory 68, only when the substrate ID is identical to the unique substrate ID stored in the ROM 61 is the permission command C1 executed.

Accordingly, it is possible to prevent the permission command C1 from being executed by another endoscope apparatus having a different substrate ID.

As described above, in the shipping state of the endoscope apparatus 1, rather than the flag RAM 63, the dynamic range change program P2, the real-time distance measurement program P4, the light amount increase program P6, or the like are set to the restriction state. Thus, it is difficult to execute the temperature alert function or the like.

As described above, in the time-of-shipping state, the endoscope apparatus 1 is configured in accordance with a specification of restricting the functions.

In addition, in response to the request of the operator, the value of the flag in the table T1 of the flag RAM 63 is rewritten by using the flash memory, and thereby at least some of the programs are switched from the restriction state to the permission state. In such a manner, it is possible to increase the number of executable functions.

By activating a function which was previously restricted from being executed without changing the configuration of the endoscope apparatus 1, it is possible to increase (upgrade) the functions executable in the endoscope apparatus 1.

More specifically, the configurations of the machine parts (hardware) of the endoscope apparatuses having two kinds of specifications are made to be the same as each other. In addition, the endoscope apparatus having one of the specifications is subjected to software restrictions so as not to execute some of the programs.

The endoscope apparatus having the other one of the specifications is not subjected to the software restrictions.

With such a configuration, it is possible to set different functions between the endoscope apparatuses while making the configurations of the machine parts of both specifications be the same as each other. In addition, it is possible to easily lift the restrictions on the functions of the endoscope apparatus.

Accordingly, by carrying out mass production with the configurations of the machine parts of the endoscope apparatuses made to be the same, it is possible to increase the lineup of the endoscope apparatus while suppressing costs necessary to manufacture the endoscope apparatus.

Second Embodiment

Next, a second embodiment of the invention will be described with reference to FIGS. 15 to 18. However, in the case where common elements exist in the embodiments, those elements will be referenced by the same reference numerals and signs, a detailed description thereof will be omitted, and only differences will be described.

Figure 15:
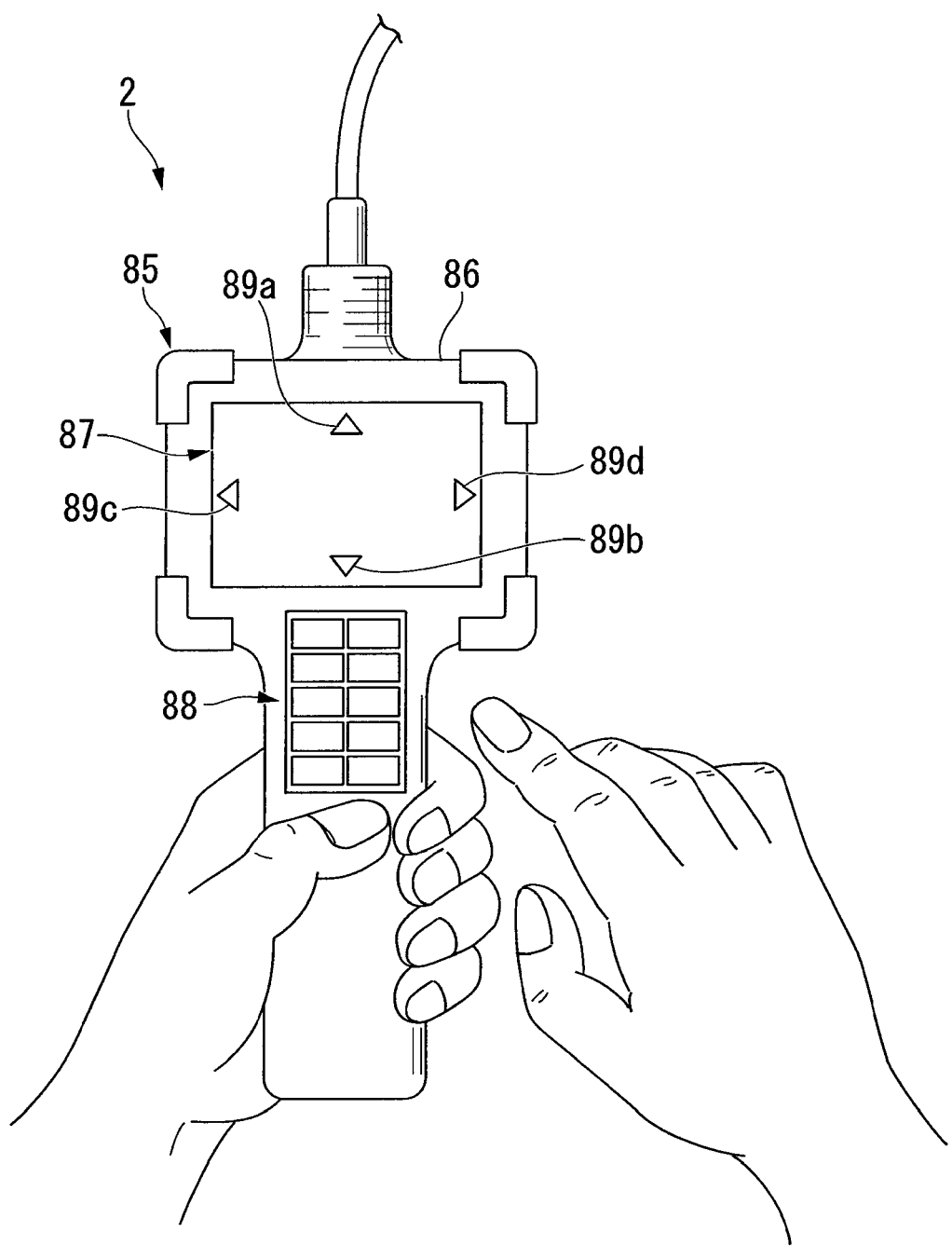
FIG. 15 is a diagram illustrating an operation section of an endoscope apparatus according to a second embodiment of the invention.

As shown in FIG. 15, an endoscope apparatus 2 of the second embodiment includes an operation section 85, which is used in combination with a main body unit of the endoscope, instead of the operation section 30 of the endoscope apparatus 1 of the first embodiment.

The operation section 85 includes a first monitor (the input section) 87 and a second monitor (the input section) 88 which are known touch panel type monitors and are vertically arranged on the surface of the operation section main body 86.

The first monitor 87 and the second monitor 88 are, for example, capacitance type sensors, each of which detects a touched position on the surface thereof.

The first monitor 87 is disposed on the upper side of the second monitor 88, and has the same functions as the joystick 32 and the LCD monitor 80 of the first embodiment.

On the display screen of the first monitor 87, the dynamic image acquired by the image capturing unit 13 is displayed. In addition, at the edges of the first monitor 87, arrows 89a to 89d indicating bending directions of the bending portion 11 are displayed.

Further, the operation section main body 86 has a motor that operates a wire (not shown) for bending the bending portion 11 in accordance with the arrows 89a to 89d, and the motor is built in the operation section main body 86.

The operator is able to bend the bending portion 11 in a desired direction by pressing the arrows 89a to 89d while viewing the dynamic image displayed on the first monitor 87.

The second monitor 88 is used instead of the LIGHT button 73 and power supply button 74 of the main body unit 50 and the joystick 32 or the like of the first embodiment.

Figure 16:
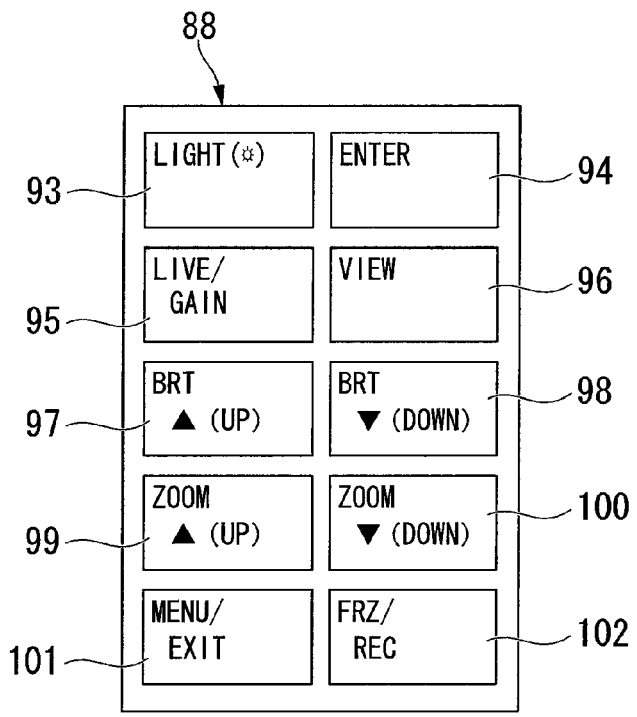
FIG. 16 is a diagram illustrating display content at the time-of-shipping of a second monitor of the operation section.

As shown in FIG. 16, a total of 10 buttons 93 to 102, arranged two lines in the widthwise direction by five lines in the lengthwise direction, are disposed on the second monitor 88. The display of the 10 buttons 93 to 102 is not limited to this particular configuration, however, and any other appropriate configuration may be used.

The buttons 93 and 94 are disposed on the upper side of the second monitor 88, and the following buttons are disposed so that, as a position of a button is closer to the buttons 101 and 102 from the buttons 95 and 96, the button is closer to the lower side of the second monitor 88.

In the time-of-shipping state, the button 93 is used instead of the LIGHT button 73 of the first embodiment.

Likewise, the button 94 is used instead of the joystick 33, the button 95 is used instead of the button 37 (the LIVE/GAIN button), the button 96 is used instead of the button 38 (the VIEW button), and the buttons 97 and 98 are used instead of the lever 34 (the BRT lever).

Moreover, the buttons 99 and 100 are used instead of the lever 35 (the ZOOM lever), the button 101 is used instead of the button 36 (the MENU/EXIT button), and the button 102 is used instead of the buttons 39a and 39b (the FRZ/REC button).

In the endoscope apparatus 2 configured as described above, for example, the high beam function and the WiDER function or the like, which are restricted similarly to the endoscope apparatus 1 of the first embodiment, may be activated. In this case, in accordance with change of the flag values, display of the corresponding buttons 93, 94, and 95 is highlighted as that of the buttons 93A, 94A, and 95A shown in FIG. 17.

Specifically, for example, the background colors of the buttons 93, 94, and 95 are changed, and "High Beam" is additionally displayed on the button 93 corresponding to the high beam function.

According to the endoscope apparatus 2 of the embodiment, as the light amount increase program P6 is switched into the permission state in terms of software, it is possible to assign the input for executing the light amount increase program P6 to the button 93A.

Moreover, by additionally displaying the "High Beam" on the button 93A, it is possible to make an operator clearly recognize the executable functions.

Further, in the embodiment, when a function is newly added to the endoscope apparatus 2, arrangement of the buttons may be changed so that the added function is easily recognized.

Figure 17:
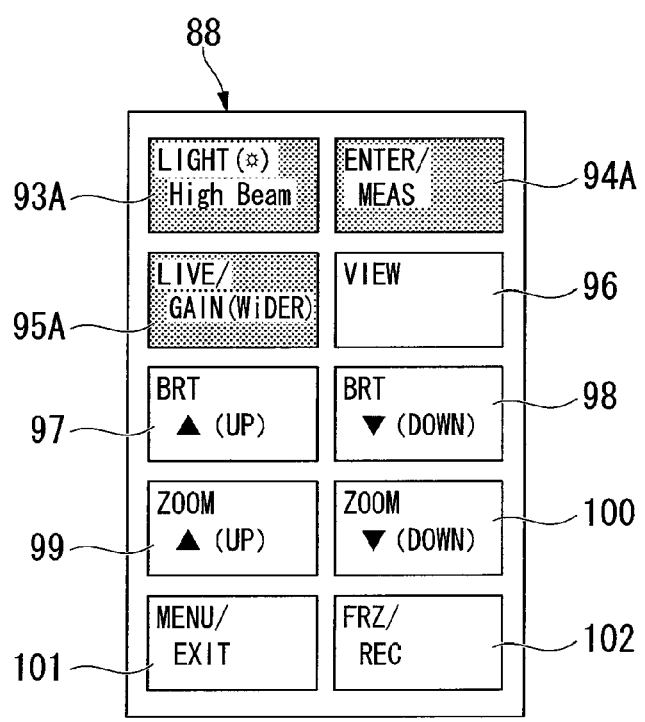
FIG. 17 is a diagram illustrating display content of the second monitor when restricted functions can be executed.
Figure 18:
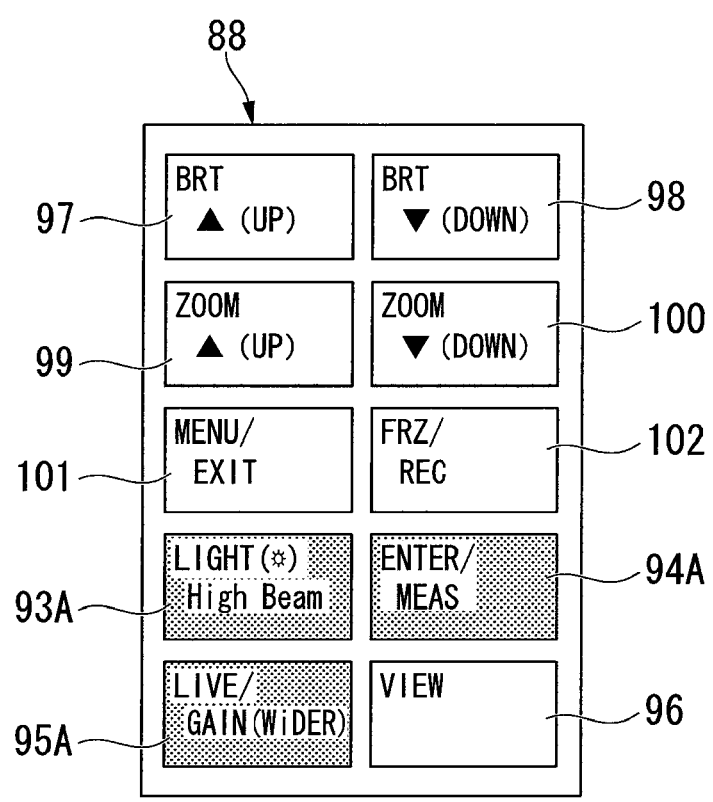
FIG. 18 is a diagram illustrating display content of the second monitor of the endoscope apparatus according to a modified example of the second embodiment of the invention.

For example, the arrangement of the buttons 93A, 94A, 95A, and 96 to 102 shown in FIG. 17 may be changed, as shown in FIG. 18, so that the buttons 97 and 98 are disposed on the upper side of the second monitor 88 and the buttons 99, 100, 95A, 96 are disposed on the lower side of the display screen of the second monitor 88.

By disposing the buttons 93A, 94A, and 95A for executing the new functions so as to be close to the operator's hand, it is possible to more clearly recognize the added functions.

The preferred examples of the invention have been hitherto described, but the invention is not limited to these examples. Addition, omission, replacement, and various other modifications of the configuration may be made without departing from the technical scope of the invention.

For example, in the first and second embodiments, the restriction section is the flag RAM 63.

However, the restriction section is not limited to this. For example, the restriction section may be a program that restricts the execution of the above-mentioned program P1 to P6, and a program that puts the program P1 to P6 or the like to a permission state by restricting the execution of the restriction program on the basis of a permission command.

Further, the permission command is stored in a unit such as a processing tool connected to the endoscope apparatus 1 instead of the flash memory 68. Thus, the permission command may be executed when the unit is mounted on the endoscope apparatus 1.

Further, in the first and second embodiments, the flash memory 68 stores the permission command C1 corresponding to one function which is the real-time distance measurement function.

However, the permission command stored in the flash memory 68 is not limited to corresponding to one function, and a permission command corresponding to two or more functions may be stored therein.

On the other hand, the flash memory 68 may store the restriction command, which switches each program from the permission state to the restriction state, corresponding to one function or two or more functions. In this connection, the permission command C1 may also be configured to upgrade a desired program only for a predetermined time period, before switching the program back to the restriction state (i.e., before switching back to the initial locked state). In this way, the user may install the desired program to obtain an additional function if such function is only needed for a short time. The permission command C1 may additionally be configured to control the endoscope apparatus 1 to display a message notifying the user before the predetermined time period expires.

Further, in the first and second embodiments, the permission command is stored in the flash memory 68, and thus the permission command C1 is executed when the flash memory 68 is connected to the storage medium control section 64. However, the permission command may be issued by operations of the joystick 32 or the like of the operation section 30. Still further, the permission command C1 may be communicated to the endoscope apparatus 1 or other detection apparatus via the Internet or other network, such as a Local Area Network or wireless network.

In the first and second embodiments, in order to execute the light amount increase program P6, the long pushing operation is performed on the LIGHT button 73. However, instead of this operation, the normal pushing operation, which is the same as the operation for executing the light on/off program P5, may be performed on the LIGHT button 73.

Specifically, when the light amount increase program P6 is set to the permission state, the light on/off program P5 is set to the restriction state.

In addition, whenever the LIGHT button 73 is subjected to the normal pushing operation, the LED 20 may be switched in order of the normal light-on state, the high-intensity light-on state, the light-off state, or the like.

With such a configuration of the endoscope apparatus, it is possible to increase the number of the adjustment steps of the LED 20 due to the LED control section 56 from two steps before the execution of the light amount increase program P6 to three steps after the execution of the light amount increase program P6.

In addition, in the first and second embodiments, the non-destructive testing system comprises an endoscope apparatus. However, the testing system is not limited to the endoscope apparatus, and may be an eddy-current flaw detection apparatus or an ultrasonic flaw detection apparatus, or any other detection apparatus.

In the first and second embodiments, only the gain mode change program P1, the dynamic range change program P2, the real-time distance measurement program P4, and the light amount increase program P6, which need the switching of the permission/restriction state, may be switched between the permission state and the restriction state by using the flag RAM 63.

Further, in the first and second embodiments, while the endoscope apparatus 1 is initialized by activating the apparatus, the executable function may be displayed on the LCD monitor 80.

While preferred embodiments of the invention have been described and illustrated above, it should be understood that these are exemplary of the invention and are not to be considered as limiting. The invention is not considered as limited to the above description, and may be limited only by the technical scope of the appended claims.

What is claimed is:

1. A nondestructive testing apparatus comprising:
    a storage section which stores a plurality of predetermined functions which are executable by the nondestructive testing apparatus, wherein each of the predetermined functions is initially set to one of a permitted state and a disabled state;
    an input section which includes a plurality of input portions respectively corresponding to the predetermined functions; and
    a control section which is adapted to receive permission information including information which unlocks at least one of the predetermined functions initially set in the disabled state so as to be set to the permitted state;
    wherein the control section automatically assigns the at least one predetermined function which has been unlocked to the corresponding input portion of the input section.

2. The nondestructive testing apparatus according to claim 1, wherein the storage section further stores an apparatus identifier which is unique to the nondestructive testing apparatus.

3. The nondestructive testing apparatus according to claim 2, wherein the control section unlocks the at least one predetermined function when the apparatus identifier stored in the storage section matches a received apparatus identifier included in the permission information.

4. The nondestructive testing apparatus according to claim 1, wherein the control section is adapted to receive the permission information from a detachably connected storage medium having the permission information stored thereon.

5. The nondestructive testing apparatus according to claim 1, wherein the control section is adapted to receive the permission information from the Internet.

6. The nondestructive testing apparatus according to claim 1, wherein the unlocked function reverts to the initial state after a predetermined time period has expired.

7. A nondestructive testing apparatus comprising:
    storage means for storing a plurality of predetermined functions which are executable by the nondestructive testing apparatus, each of the predetermined functions being one of an initially permitted function and an initially disabled function;
    input means for controlling respective corresponding ones of the predetermined functions; and
    control means for receiving permission information including information which unlocks at least one of the predetermined functions which are initially disabled from being executed to be set to a permitted state;
    wherein the unlocked function is automatically assigned to the corresponding input means.

8. The nondestructive testing apparatus according to claim 7, wherein the storage means further stores an apparatus identifier which is unique to the nondestructive testing apparatus.

9. The nondestructive testing apparatus according to claim 8, wherein the permission information is received when it is determined that the stored apparatus identifier matches a received apparatus identifier included in the permission information.

10. The nondestructive testing apparatus according to claim 7, wherein the permission information is received from a detachably connected storage medium having the permission information stored thereon.

11. The nondestructive testing apparatus according to claim 7, wherein the permission information is received from the Internet.

12. The nondestructive testing apparatus according to claim 7, wherein the unlocked function reverts to the initial state after a predetermined time period has expired.

13. A non-transitory computer readable medium having a program stored thereon for controlling a nondestructive testing apparatus including a storage section, a receiving section, and an input section to perform functions comprising:
    storing, in the storage section, a plurality of predetermined functions which are executable by the nondestructive testing apparatus, each of the predetermined functions being one of an initially permitted function and an initially disabled function;
    receiving permission information including information which unlocks at least one of the predetermined functions which are initially disabled from being executed to be set to a permitted state; and
    automatically assigning the unlocked function to a corresponding input portion of the input section.

14. The computer-readable medium according to claim 13, wherein the program controls the nondestructive testing apparatus to further store an apparatus identifier which is unique to the nondestructive testing apparatus.

15. The computer-readable medium according to claim 14, wherein the program controls the nondestructive testing apparatus to receive the permission information when it is determined that the apparatus identifier stored in the storage section matches a received apparatus identifier included in the permission information.

16. The computer-readable medium according to claim 13, wherein the program controls the nondestructive testing apparatus to receive the permission information from a detachably connected storage medium having the permission information stored thereon.

17. The computer-readable medium according to claim 13, wherein the program controls the nondestructive testing apparatus to receive the permission information from the Internet.

18. The computer-readable medium according to claim 13, wherein the program controls the nondestructive testing apparatus to revert the unlocked function to the initial state after a predetermined time period has expired.

\* \* \* \* \*